(12) United States Patent
Suzuki et al.

(10) Patent No.: US 7,423,735 B2
(45) Date of Patent: Sep. 9, 2008

(54) BEAM IRRADIATION APPARATUS

(75) Inventors: Yoshihisa Suzuki, Ichinomiya (JP);
Hitoshi Terasaki, Motosu-Gun (JP)

(73) Assignee: Sanyo Electric Co., ltd., Osaka (JP)

( * ) Notice: Subject to any disclaimer, the term of this patent is extended or adjusted under 35 U.S.C. 154(b) by 0 days.

(21) Appl. No.: 11/682,449

(22) Filed: Mar. 6, 2007

(65) Prior Publication Data

US 2007/0215787 A1    Sep. 20, 2007

(30) Foreign Application Priority Data

Mar. 15, 2006   (JP) .............................. 2006-070162

(51) Int. Cl.
G01C 3/08      (2006.01)
G02B 26/08     (2006.01)

(52) U.S. Cl. ...................... 356/4.01; 359/196

(58) Field of Classification Search .............. 356/4.01, 356/5.01, 28, 141.1; 250/201.2, 234; 359/850
See application file for complete search history.

(56) References Cited

U.S. PATENT DOCUMENTS 6,122,040 A * 9/2000 Arita et al. ................ 356/4.01
6,229,597 B1 * 5/2001 Kikuchi .................... 356/4.01
6,327,029 B1 * 12/2001 Matsuoka .................. 356/5.01
6,687,035 B2 * 2/2004 Knebel et al. .............. 359/204
7,167,235 B2 * 1/2007 Kikuchi .................... 356/4.01
7,262,765 B2 * 8/2007 Brown et al. ............... 345/207
7,351,944 B2 * 4/2008 Yamada et al. ............. 250/205

FOREIGN PATENT DOCUMENTS

JP    11-083988    3/1999

* cited by examiner

Primary Examiner—Isam Alsomiri
(74) Attorney, Agent, or Firm—Ditthavong Mori & Steiner, P.C.

(57) ABSTRACT

Two mirrors are placed in such a manner as to line in a Z-axis direction in a beam irradiation head. These mirrors are located at a position beyond a normal scan range of the laser light in the Z-axis direction and within a limit range of scanning of the laser light, and the angles of inclination of mirrors are adjusted so as to reflect incident laser light toward a PD. In the case where a lens is driven in a Z-axis direction (a lateral scanning direction), driving current values Ia, Ib of an actuator at the times when reflected light from these two mirrors enters the PD at the maximum light quantity are detected. A driving current Imz required to position a lens for irradiation at a neutral position and a drive amount Δzd of the lens for irradiation per a unit driving current are then determined based on the detected driving current Ia and Ib.

13 Claims, 13 Drawing Sheets

BEAM IRRADIATION APPARATUS

This application claims priority under 35 U.S.C. Section 119 of Japanese Patent Application No. 2006-070162 filed Mar. 15, 2006.

BACKGROUND OF THE INVENTION

1. Field of the Invention

The present invention relates to a beam irradiation apparatus which is suitably used in an inter-vehicle distance detector, a distance detector, and the like.

2. Description of the Related Art

In recent years, detection apparatuses which irradiate laser light to a target region to detect an obstacle within the target region are mounted on household passenger automobiles and the like. In such detection apparatuses, the presence or absence of the obstacle within the target region and a distance to the obstacle is detected based on the conditions of reflected light in irradiating laser light to the target region.

Here, irradiation of the laser light to the target region is ordinarily performed by a beam irradiation apparatus located in the detection apparatus. The beam irradiation apparatus includes an actuator using a polygon mirror and a lens actuator as a configuration for scanning the laser light within the target region.

In Japanese Patent Publication Laid-Open No. 11-83988, there is introduced a mechanism of scanning by a lens actuator. In accordance with this scanning mechanism, the laser light is scanned within the target region by driving a lens in two-dimensional directions. In this case, by appropriately adjusting a driving current applied to the actuator, a position within the target region to which the laser light is irradiated can be freely changed. Therefore, a scanning pattern of the laser light can be freely established.

However, in the scanning mechanism using a lens actuator, there is a possibility that the error in a relationship between the driving current and a shift amount of a lens (a position of laser light-irradiation) may be produced due to secular changes or the like. In this case, even if a prescribed driving current is applied to the actuator, the laser light is irradiated to a position deviated from a target position.

SUMMARY OF THE INVENTION

The present invention is made to solve such a problem, and it is an object of the present invention to provide a beam irradiation apparatus which can attain a correct scanning action smoothly with a simple construction.

A first aspect of the present invention pertains to a beam irradiation apparatus for irradiating a beam to a target region. This beam irradiation apparatus comprises a light source for emitting laser light, an actuator for scanning the laser light within the target region, an actuator drive unit for applying a driving signal to the actuator, a reflecting unit located at a position beyond a normal scan range of the laser light and within a limit range of scanning by the actuator, a light receiving element for receiving the laser light reflected by the reflecting unit, a comparing unit, while monitoring a detected signal outputted from the light receiving element when scanning the laser light beyond the normal scan range, for detecting a value of the driving signal applied to the actuator at the time when the detected signal being the maximum, and a controlling unit for controlling a drive of the actuator based on the value of the driving signal detected by the comparing unit. Herein the reflecting unit is located at both positions of a first position in scanning the laser light in a first direction and a second position in scanning the laser light in a second direction opposite to the first direction.

In accordance with the beam irradiation apparatus of the first aspect, for example, a value of a driving signal required to direct the laser light toward a neutral position in the normal scan range in the first and second directions can be determined based on the values of the driving signals detected by the comparing unit in scanning the laser light in the first direction and the second direction.

For example when the first position and the second position are located at the same angles D in the first direction and the second direction, respectively, from the neutral position in the normal scan range, if the values of the driving signals detected by the comparing unit in scanning the laser light in the first direction and the second direction are taken as I1 and I2, the driving signal Im required to direct the laser light toward the neutral position can be calculated from the following equation; $Im=(I1+I2)/2$. Further, an displacement angle $\Delta d$ of the laser light per a unit amount of the driving signal in the first direction and the second direction can be calculated from the following equation; $\Delta d=2D/(I1+I2)$. However, this calculation method is based on the assumption that a relationship between the value of the driving signal and a scan amount of the laser light is linear.

Thus, in accordance with the beam irradiation apparatus of the first aspect, parameter values required to direct the laser light toward a prescribed irradiation position can be acquired based on the values of the driving signals detected by the comparing unit. Therefore, even if secular changes occur in the actuator or the like, it is possible to irradiate the laser light to a prescribed irradiation position correctly by controlling driving of the actuator based on parameter values acquired at the time of operation.

The beam irradiation apparatus of the first aspect adopts an extremely simple configuration of locating just a reflecting unit for performing such an operation and effect. Accordingly, the configuration of the beam irradiation apparatus can be prevented from being complicated.

Further, in the present invention, since the reflecting unit is located beyond a normal scan range, the laser light does not enter the reflecting unit at the time of a normal scanning action. Therefore, reflected light from the reflecting unit does not enter a photodetector receiving reflected light from the target region as stray light at the time of a normal scanning action and therefore if the present invention is employed, the present invention does not interfere with the operations of detecting obstacles.

In the beam irradiation apparatus of the first aspect, the photodetector receiving light from the target region can be constructed so as to also serve as the light receiving element. When the photodetector is constructed like this, the light receiving element can be eliminated and therefore the configuration of the beam irradiation apparatus can be simplified.

In the beam irradiation apparatus of the first aspect, the controlling unit can be constructed in such a way that a value of the driving signal required to direct the laser light toward a neutral position in the normal scan range in the first and second directions is determined based on the values of the driving signals detected by the comparing unit when scanning the laser light in the first direction and the second direction. In this case, the value of the driving signal required to direct the laser light toward a neutral position in the normal scan range are acquired.

The beam irradiation apparatus of the first aspect can be constructed so as to further comprise a position detecting unit for detecting a scanning position of the laser light. In this case, the controlling unit can be constructed in such a way that the value of the driving signal required to direct the laser light toward a neutral position in the normal scan range in the first and second directions is determined based on the values of the driving signals detected by the comparing unit and the scanning positions detected by the position detecting unit at the time when the values of the driving signals detected by the comparing unit. When the controlling unit is constructed like this, it is possible to make the value of the driving signal required to direct the laser light toward a neutral position in the normal scan range more proper.

Further, the controlling unit can also be constructed in such a way that an amount of the driving signal required to displace the laser light by a unit amount of displacement in the first and second directions is determined based on the values of the driving signals detected by the comparing unit in addition to acquiring the value of the driving signal required to direct the laser light toward a neutral position in the normal scan range in the first and second directions. When the controlling unit is constructed like this, it is possible to make the amount of the driving signal required to displace the laser light by the unit amount of displacement proper dynamically.

Further, the controlling unit can include a table listing a value of the driving signal required to direct the laser light toward an irradiation position defined within the target region. In this case, the controlling unit can be constructed in such a way that the value of the driving signal in the first and second directions listed in the table is corrected based on the values of the driving signals detected by the comparing unit when scanning the laser light in the first direction and the second direction. When the controlling unit is constructed like this, it is possible to make the values in the table proper dynamically.

Further, the controlling unit can be constructed so as to execute computation processing of determining a value of the driving signal required to direct the laser light toward an irradiation position defined within the target region based on drive characteristics of the actuator. In this case, the controlling unit can be constructed so as to correct the drive characteristics of the actuator used in the computation processing based on the values of the driving signals detected by the comparing unit when scanning the laser light in the first direction and the second direction. When the controlling unit is constructed like this, it is possible to make the value of the driving signal required to direct the laser light toward an irradiation position defined within the target region proper dynamically.

A second aspect of the present invention pertains to a beam irradiation apparatus for irradiating a beam to a target region. This beam irradiation apparatus comprises a light source for emitting laser light, an actuator for scanning the laser light within the target region, an actuator drive unit for applying a driving signal to the actuator, a reflecting unit located at a position beyond a normal scan range of the laser light and within a limit range of scanning by the actuator, a light receiving element for receiving the laser light reflected by the reflecting unit, a comparing unit, while monitoring a detected signal outputted from the light receiving element when scanning the laser light beyond the normal scan range, for detecting a value of the driving signal applied to the actuator at the time when the detected signal being the maximum, a position detecting unit for detecting a scanning position of the laser light, and a controlling unit for controlling a drive of the actuator based on the value of the driving signal detected by the comparing unit and the scanning position detected by the position detecting unit at the time when the value of the driving signal detected by the comparing unit. Herein, the reflecting unit is located at both positions of a first position in scanning the laser light in a first direction and a second position in scanning the laser light in a second direction opposite to the first direction.

In accordance with this invention, a drive control of the actuator is dynamically performed based on the values of the driving signals detected by the comparing unit and the scanning position detected by the position detecting unit at the time when the values of the driving signals detected by the comparing unit. Therefore, even if secular changes occur in the actuator or the like, the drive of the actuator can be controlled so as to irradiate the laser light to a prescribed irradiation position correctly. In this time, since the drive control of the actuator is performed in consideration of the scanning position detected by the position detecting unit in addition to the value of the driving signal detected by the comparing unit, the laser light can be irradiated to a prescribed irradiation position more precisely than the case of only the value of the driving signal detected by the comparing unit.

A third aspect of the present invention pertains to a beam irradiation apparatus for irradiating a beam to a target region. This beam irradiation apparatus comprises a light source for emitting laser light, an actuator for scanning the laser light within the target region, an actuator drive unit for applying a driving signal to the actuator, a light receiving unit located at a position beyond a normal scan range of the laser light and within a limit range of scanning by the actuator, a comparing unit, while monitoring a detected signal outputted from the light receiving element when scanning the laser light beyond the normal scan range, for detecting a value of the driving signal applied to the actuator at the time when the detected signal being the maximum, and a controlling unit for controlling a drive of the actuator based on the value of the driving signal detected by the comparing unit. Herein, the light receiving unit is located at both positions of a first position in scanning the laser light in a first direction and a second position in scanning the laser light in a second direction opposite to the first direction.

In the beam irradiation apparatus of the first aspect, the incidences of the laser light to the first position and the second position are detected by use of a combination of the reflecting unit and the light receiving element, but in the beam irradiation apparatus of the third aspect, the incidences of the laser light to the first position and the second position are detected by placing the light receiving unit directly at the first position and the second position. In accordance with the third aspect, mirrors are eliminated but the light receiving unit is added compared with the first aspect. In accordance with the beam irradiation apparatus of the third aspect, as with the beam irradiation apparatus of the first aspect, it is possible to make the scanning position of the laser light proper dynamically.

In addition, also in the beam irradiation apparatuses of the second and the third aspects, as with the beam irradiation apparatus of the first aspect, the controlling unit can be constructed so as to determine a value of the driving signal required to direct the laser light toward a neutral position in the normal scan range or so as to determine an amount of the driving signal required to displace the laser light by a unit amount of displacement based on the value of the driving signal detected by the comparing unit, or the controlling unit can be constructed so as to correct the table or the drive characteristics of the actuator dynamically.

As described above, in accordance with the beam irradiation apparatuses of the respective aspects, parameter values required to direct the laser light toward a prescribed irradiation position can be acquired dynamically based on the value of the driving signal detected by the comparing unit, and the table or the drive characteristics to be used in order to drive the actuator can be appropriately corrected. Accordingly, even if secular changes occur in the actuator or the like, it is possible to irradiate the laser light to a prescribed irradiation position correctly by driving the actuator based on parameters, a table or drive characteristics acquired in succession.

BRIEF DESCRIPTION OF THE DRAWINGS

The above and further objects, and novel features of the present invention will more fully appear from the description of the embodiment described below when the same is read in connection with the following accompanying drawings.

However, these drawings are for the purpose of references for illustrating the embodiments and the present invention is not intended to be limited by these drawings.

DESCRIPTION OF THE PREFERRED EMBODIMENTS

Figure 1:
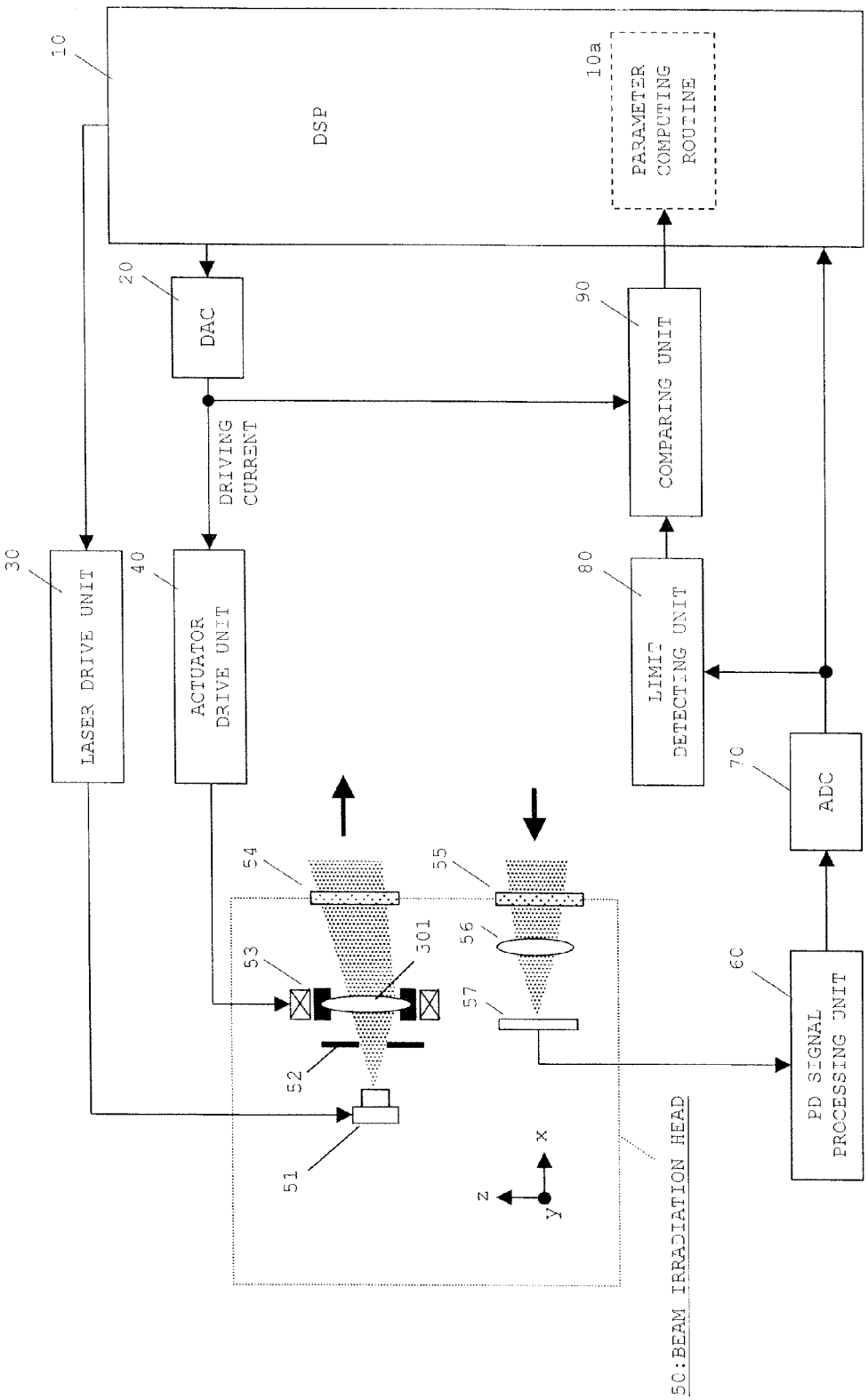
FIG. 1 shows a construction of a beam irradiation apparatus of an embodiment.

A construction of a beam irradiation apparatus of an embodiment is shown in FIG. 1.

As shown in the drawing, a beam irradiation apparatus includes a digital signal processor (DSP) 10, a digital analog converter (DAC) 20, a laser drive unit 30, a actuator drive unit 40, a beam irradiation head 50, a PD signal processing unit 60, an analog digital converter (ADC) 70, a the limit detection unit 80, and a comparing unit 90.

The DSP 10 outputs control signals to the laser drive unit 30 and outputs the signals for controlling the drive of the actuator drive unit 40 to the DAC 20. Further, the DSP 10 has a parameter computing routine 10a which calculates the control parameters of the lens actuator 53 (described later) based on the signals inputted from the comparing unit 90. Incidentally, the parameter computing routine 10a will be described in detail later.

The DAC 20 converts the control signals inputted from the DSP 10 to analog signals and outputs the converted signals to the actuator drive unit 40. Simultaneously, the DAC 20 also outputs the control signals (driving current) outputted to the actuator drive unit 40 to the comparing unit 90.

The laser drive unit 30 drives a semiconductor laser 51 in the beam irradiation head 50 according to the control signals inputted from the DSP 10. The actuator drive unit 40 drives the lens actuator 53 in the beam irradiation head 50 according to the control signals (driving current) inputted from the DAC 20.

The beam irradiation head 50 includes the semiconductor laser 51, an aperture 52, a lens actuator 53, an output window 54, an incident window 55, a condensing lens 56, and a photodetector (PD) 57.

Figure 2:
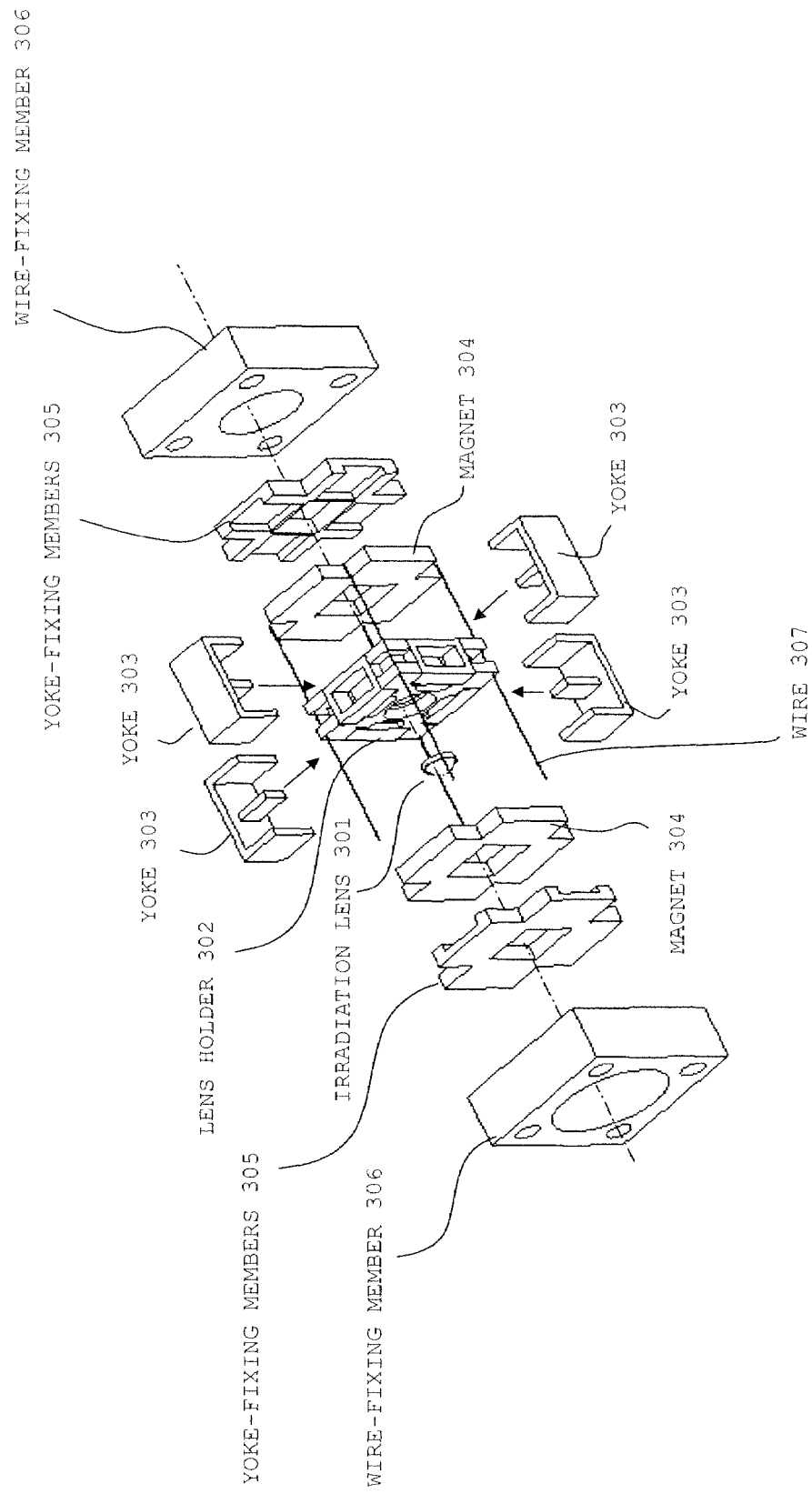
FIG. 2 shows a construction of a lens actuator of the embodiment.

A construction example of the lens actuator is shown in FIG. 2.

An irradiation lens 301 is fitted into an opening at the center of a lens holder 302. The lens holder 302 is equipped with a coil on each of four side faces and a central projection of each yoke 303 is inserted into each coil as shown by arrow. Each yoke 303 has tongues at both ends, which are fitted into a depression of a pair of yoke-fixing members 305. Further, a magnet 304 is attached fixedly to each yoke-fixing members 305 with the tongue of the yoke 303 sandwiched between the magnet 304 and the yoke-fixing member 305. In this state, the yoke-fixing members 305 together with the magnet 304 are mounted on a base (not shown).

Further, a pair of wire-fixing members 306 is fixed to the base and the lens holder 302 is supported elastically by the wire-fixing members 306 through wires 307. The lens holder 302 is perforated with 4 holes at the four corners, through which wires 307 are passed. After passing the wire 307 through each hole, the both ends of the wire 307 is fixed to the wire-fixing members 306. Thereby, the lens holder 302 is supported elastically by the wire-fixing members 306 through the wires 307.

Driving signals are supplied from the above-mentioned actuator drive circuit 40 to each coil which is provided for the lens holder 302 when driving the lens. Thereby, an electromagnetic drive force is generated and the irradiation lens 301 together with the lens holder is drive in two-dimensional directions.

Returning to FIG. 1, the laser light exiting the semiconductor laser 51 is shaped into a desired shape by the aperture 52, and then enters the irradiation lens 301 supported by the lens actuator 53. Herein, the irradiation lens 301 is supported by the lens actuator 53 so as to be movable in a direction of a Y-Z plane in FIG. 1, as described above. Therefore, the laser light having passed through the irradiation lens 301 changes in an output angle in a direction of a Y-Z plane according to the drive of the lens actuator 53. Thereby, the irradiation of the laser light in the target region is performed.

Reflected light from the target region passes through the incident window 55 and then is focused on the PD 57 by the condensing lens 56. The PD 57 outputs signals according to the quantity of received light to the PD signal processing unit 60. In addition, the PD 57 also receives the laser light reflected by mirrors in the beam irradiation head 50.

Figures 3A, 3B:
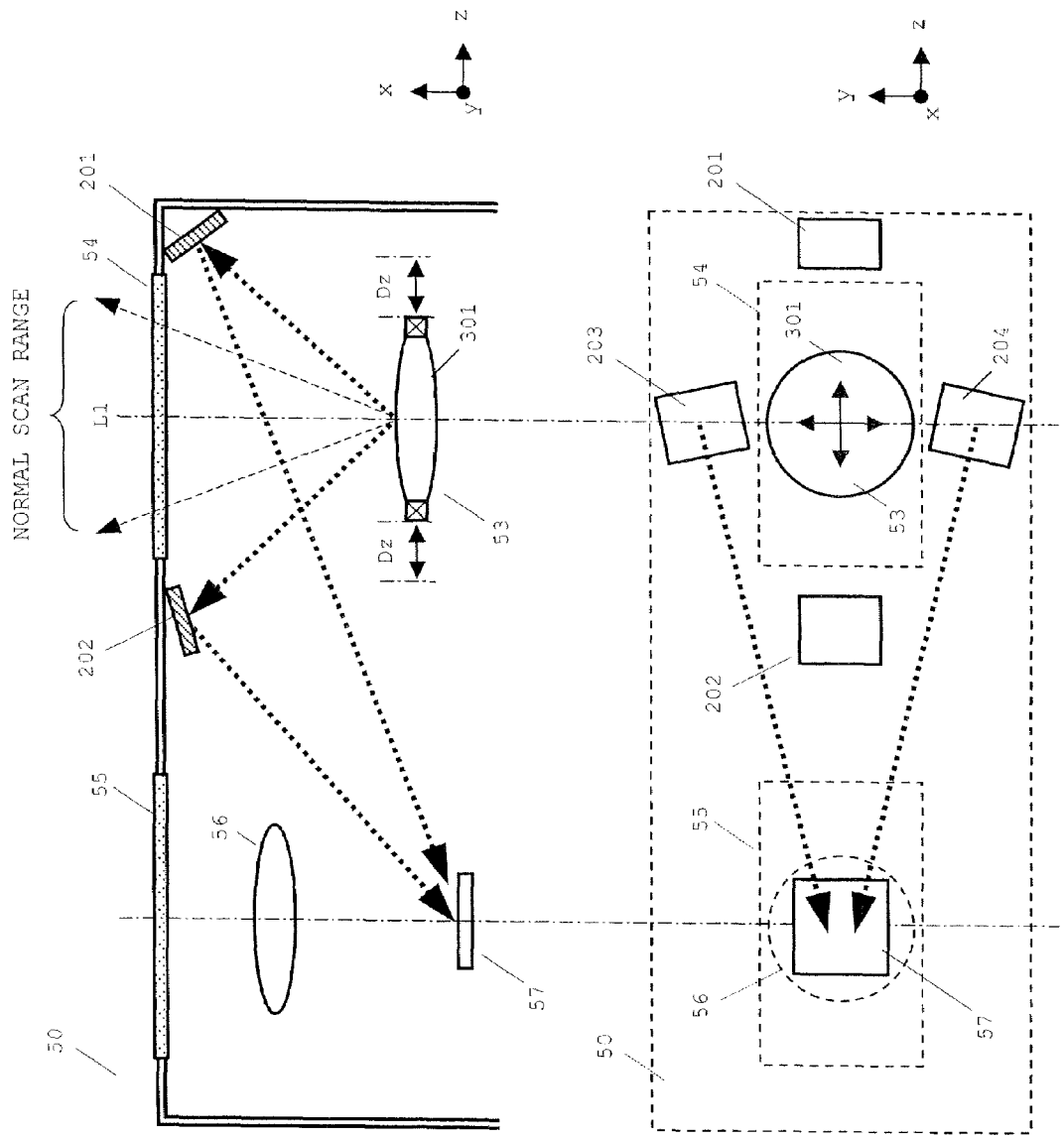
FIGS. 3A and 3B are views illustrating an arrangement of mirrors of the embodiment.

An arrangement of mirrors is shown in FIGS. 3A and 3B. FIG. 3A is an internal view of the beam irradiation apparatus as perspectively viewed from the Y-axis, and FIG. 3B is an internal view of the beam irradiation apparatus as perspectively viewed from the X-axis.

First, referring to FIG. 3A, two mirrors 201, 202 are placed in such a manner as to line in a Z-axis direction in a beam irradiation head 50. Here, the mirrors 201, 202 are located at a position beyond a normal scan range of the laser light in the Z-axis direction and within a limit range of scanning of the laser light. That is, the laser light does not enter the mirrors 201, 202 at the time of a normal scanning action. The laser light enters the mirrors 201, 202 at the time of a scanning correction action described later.

The angles of inclination of the mirrors 201, 202 are adjusted so as to reflect incident laser light toward a PD 57. Further, the mirrors 201, 202 are located at positions where reflected light from the mirrors 201, 202 enters the PD 57 at the maximum light quantity in the case where the irradiation lens 301 supported by the lens actuator 53 is displaced by the same distances (Dz) from a central axis (L1) of an output window 54 in two directions on a Z-axis. Therefore, a shift amount (in a Z-axis) of the irradiation lens 301 from a position where reflected light from one of the mirrors 201, 202 enters the PD 57 at the maximum light quantity to a position where reflected light from the other of the mirrors 201, 202 enters the PD 57 at the maximum light quantity is 2Dz.

Next, referring to FIG. 3B, two mirrors 203, 204 are placed in such a manner as to line in a Y-axis direction in the beam irradiation head 50. Here, the mirrors 203, 204 are located at a position beyond a normal scan range of the laser light in the Y-axis direction and within a limit range of scanning of the laser light. That is, the laser light does not enter the mirrors 203, 204 at the time of a normal scanning action. The laser light enters the mirrors 203, 204 at the time of a scanning correction action described later.

The angles of inclination of the mirrors 203, 204 are adjusted so as to reflect incident laser light toward a PD 57. Further, the mirrors 203, 204 are located at positions where reflected light from the mirrors 203, 204 enters the PD 57 at the maximum light quantity in the case where the irradiation lens 301 supported by the lens actuator 53 is displaced by the same distances (Dy) from a central axis (L1) of a output window 54 in two directions on a Y-axis. Therefore, a shift amount (in a Y-axis) of the irradiation lens 301 from a position where reflected light from one of the mirrors 203, 204 enters the PD 57 at the maximum light quantity to a position where reflected light from the other of the mirrors 203, 204 enters the PD 57 at the maximum light quantity is 2Dz.

Returning to FIG. 1, the PD signal processing unit 60 amplifies signals received from the PD 57 and filters out the background noise of the signals and outputs the signals to the ADC 70. The ADC 70 converts the signals from the PD signal processing unit 60 to digital signals and outputs the digital signals to the DSP 10 and the limit detection unit 80. The DSP 10 detects the presence or absence of an obstacle within a target region and further calculates a distance to the obstacle based on the digital signals inputted from the ADC 70.

The limit detection unit 80 monitors the quantity of received light of the PD 57 based on the digital signals inputted from the ADC 70 at the time of a scanning correction action described later. Further, when the quantity of received light of the PD 57 becomes the maximum, the limit detection unit 80 outputs the detected signal to the comparing unit 90.

The comparing unit 90 converts driving current values inputted from the DAC 20 to digital values and monitors these driving current values and the detected signals from the limit detection unit 80. Further, the comparing unit 90 detects a driving current value inputted to the actuator drive unit 40 when the detected signal is inputted from the limit detection unit 80 and outputs the detected driving current value to the DSP 10.

The DSP 10 stores the driving current value inputted in a built-in memory of the DSP 10 and executes the following computation processing in a parameter computing routine 10a based on this stored driving current value to acquire control parameters.

First, in the case where a lens is driven in a Z-axis direction (a lateral scanning direction) from a state of FIG. 3A, if driving current values at the times when reflected light from mirrors 201, 202 enters the PD 57 at the maximum light quantity are taken as Ia, Ib, a driving current value Izm for positioning a lens at a neutral position in the Z-axis direction (lateral scanning direction) is calculated by the following equation:

$$Izm = (Ia + Ib)/2 \quad (1)$$

Similarly, in the case where a lens is driven in a Y-axis direction, if driving current values at the times when reflected light from mirrors 203, 204 enters the PD 57 at the maximum light quantity are taken as Ic, Id, a driving current value Iym for positioning a lens at a neutral position in the Y-axis direction (vertical scanning direction) is calculated by the following equation:

$$Iym = (Ic + Id)/2 \quad (2)$$

Further, a shift amount $\Delta zd$ of the lens in the Z-axis direction (lateral scanning direction) per a unit driving current is calculated by the following equation:

$$\Delta zd = 2Dz/(Ia - Ib) \quad (3)$$

Similarly, a shift amount $\Delta yd$ of the lens in the Y-axis direction (vertical scanning direction) per a unit driving current is calculated by the following equation:

$$\Delta yd = 2Dy/(Ic - Id) \quad (4)$$

In this calculation, as with the above equation (3), it is assumed that a shift amount of a lens in the Z-axis direction is proportional to a driving current.

Herein, calculations by the equations (1) to (4) are performed assumed that shift amounts of a lens in the Z-axis direction and Y-axis direction, respectively, are proportional (linear) to a driving current. In this embodiment, it is assumed that shift amounts of a lens in the Z-axis direction and Y-axis direction, respectively, are proportional to a driving current.

As described above, the comparing unit 90 detects driving current values Ia, Ib, Ic, and Id at the times when the reflected light from the mirrors 201, 202, 203, and 204 enters the PD 57 at the maximum light quantity based on the detected signals inputted from the limit detection unit 80 and the driving current values inputted from the DAC 20, and outputs these driving current values to the DSP 10. A parameter computing routine 10a of the DSP 10 executes the computations of the above equations (1) to (4) based on the driving current values Ia, Ib, Ic, and Id inputted from the comparing unit 90 to acquire the control parameters Iym, Izm, $\Delta yd$, and $\Delta zd$. Acquired control parameters are stored in a built-in memory of the DSP 10.

The DSP 10 calculates the driving current value required for irradiating the laser light to a target position based on the stored control parameters and outputs the driving current value to the DAC 20. Thereby, driving signals according to the target position are supplied to the actuator drive unit 40 and the laser light is irradiated to the target position.

Figure 4:
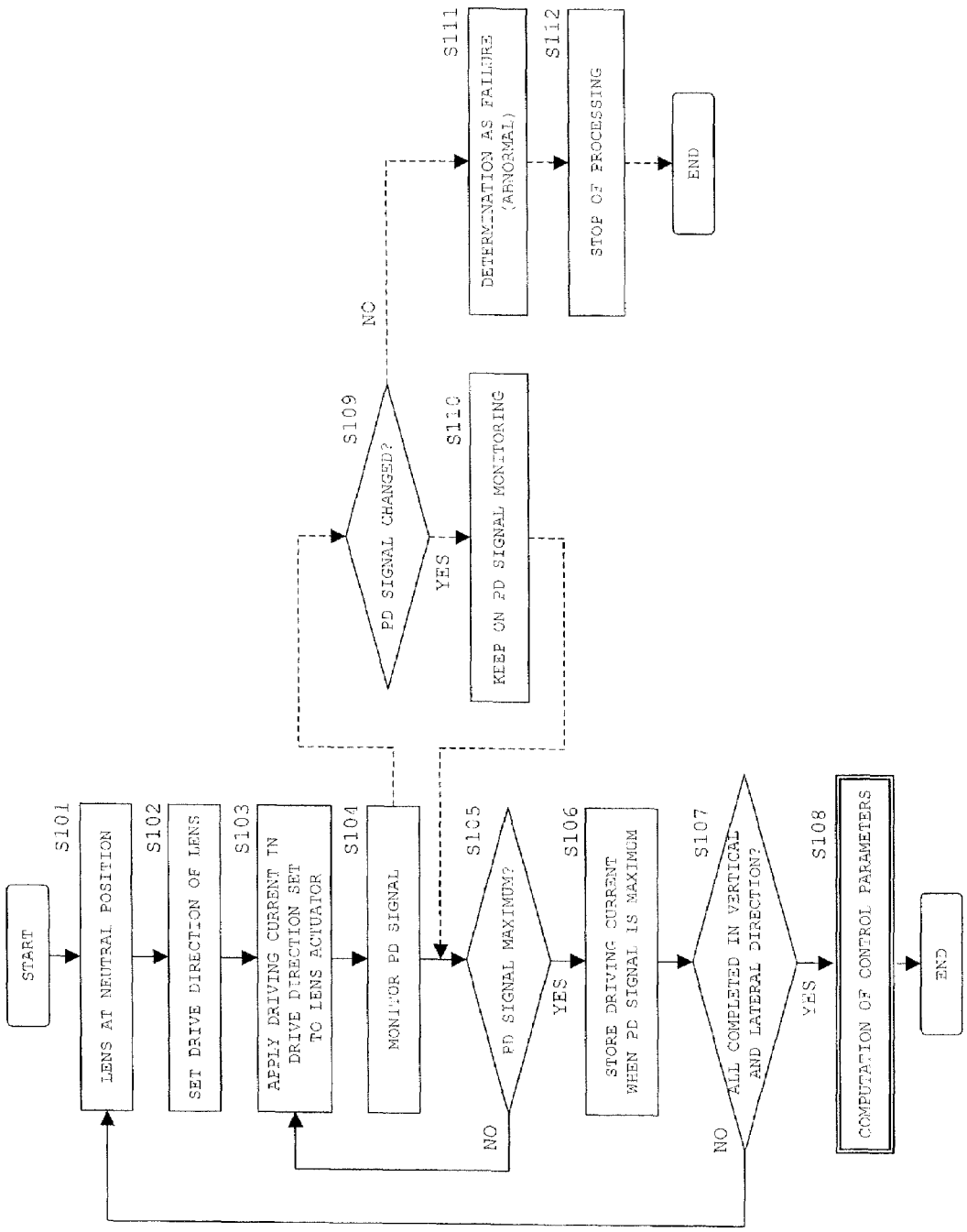
FIG. 4 is a flow chart of processing in acquiring control parameters of the embodiment.

A flow chart in acquiring the control parameters Iym, Izm, $\Delta yd$, and $\Delta zd$ is shown in FIG. 4.

After the acquisition processing of the control parameters is started, first, an offset signal is applied to the lens actuator 53 to position a lens at a neutral position (S101). In this time, when the control parameters Iym, Izm are acquired by the previous computation processing, values of the control parameters Iym, Izm are used directly as a offset signal in a Y direction and a Z direction, respectively. Further, when the control parameters Iym, Izm are not yet acquired, an offset value stored in the built-in memory of the DSP 10 is used.

Next, a drive direction of the lens is established (S102), and a driving current for driving the lens to the established direction is applied to a lens actuator (S103). Here, the drive direction is set at any of upward (a positive direction of a Y-axis), downward (a negative direction of a Y-axis), a left direction (a positive direction of a Z-axis), and a right direction (a negative direction of a Z-axis) at the step S102.

After the driving current is thus applied to the lens, a detected signal (PD signal) detected by the PD 57 is inputted to the limit detection unit 80 through the PD signal processing unit 60 and the ADC 70 (S104). The limit detection unit 80 refers to the inputted signal and determines whether the PD signal becomes the maximum or not (S105). Further, the limit detection unit 80 outputs the detected signal to the comparing unit 90 at the time when the detected signal becomes the maximum.

When the detected signal is inputted from the limit detection unit 80, the comparing unit 90 outputs a driving current value (limit driving current value) inputted from the DAC 20 at the time when the detected signal is inputted to the DSP 10. The limit driving current value inputted to the DSP 10 is stored in a built-in memory of the DSP 10 (S106). Thereby, the acquisition processing of limit driving current values in the drive direction set at S102 is completed.

After the processing in the drive direction is thus completed, it is determined whether the processing in all directions of a vertical direction and a lateral direction is completed or not (S107), and if the processing is not completed, the processing is returned to the S101 and the processing in a next drive direction is executed. Thereby, the limit driving current values in the next drive direction are stored in the built-in memory of the DSP 10. Further, after the limit driving current values (Ia, Ib, Ic, and Id) in all directions are stored in the built-in memory of the DSP 10 (S107: Yes), in a parameter computing unit 10*a*, these driving current values (Ia, Ib, Ic, and Id) are referred to and the computations of the above equations (1) to (4) are performed (S108) Thereby, values of the control parameters Iym, Izm, Δyd, and Δzd are acquired. The acquired control parameter values are stored in the built-in memory of the DSP 10.

Further, in the processing in a vertical drive direction and a lateral drive direction, if monitoring of the PD signals (S104) is started, the DSP 10 determines whether the PD signals change or not for a certain period of time after starting (S109). Further, if the PD signals changed (S109: Yes), monitoring of the PD signals is continued (S110), the acquisition processing of the limit driving current in the drive direction is performed. On the other hand, when the PD signals do not change from the beginning or in the middle, or the degree of changes in the PD signals is lower than a threshold (S109: NO), the DSP 10 judges that the lens actuator 53 is failed (S111). In this case, the DSP 10 aborts the acquisition processing of the limit driving current values (S112) and executes the processing such as outputting a message stating that the abnormal condition is produced from a display unit (not shown).

The acquisition processing of control parameters shown in FIG. 4 is performed, for example, at the start of the action of the beam irradiation apparatus and thereafter at regular intervals. Thereby, even if secular changes or environmental changes occur in the lens actuator 53, control parameters according to the conditions of the time are acquired. Therefore, if a target region-specific driving current is determined by using these control parameters, the laser light can be irradiated to the target region correctly.

Further, in the case where the beam irradiation apparatus is mounted on mobile units such as passenger automobiles, if the acquisition processing of control parameters is performed when external forces are applied to a lens such as changes in driving direction, driving and stopping, it is possible to position the lens at a proper position even if the external forces are applied. Further, if control parameter values in a normal driving aye compared with control parameter values in starting changes in driving condition to predict the control parameters in a period of time during which driving conditions change, a beam irradiation action in the period of time can be smoothed.

Further, in the flow chart of FIG. 4, after all of the driving currents Ia, Ib, Ic, and Id in all directions of a vertical direction and a lateral direction are acquired, the computation processing of the control parameters are performed, but when the limit driving currents are acquired on either of a vertical direction or a lateral direction, control parameters in a selected direction are calculated, and then when the limit driving currents are acquired on the other direction, control parameters in the other direction may be calculated.

In addition, when the beam irradiation apparatus is mounted on passenger automobiles, requirement for the scanning accuracy in a lateral direction (horizontal direction) is larger than that in a vertical direction. Accordingly, it is preferred in this case that the control parameters in a lateral direction are more proper.

In this case, it is better to perform first the processing in the vertical direction to determine the control parameters Iym and Δyd in the vertical direction and to perform then the processing in the lateral direction while using the acquired Iym as a lens offset value (a driving current to give a neutral position) in a Y direction to determine the control parameters Izm and Δzd in the lateral direction. When doing so, since the acquisition processing of the control parameters in the lateral direction is performed after making a neutral position of a lens in the vertical direction proper, it is possible to make the control parameters Izm and Δzd in the lateral direction more proper. Therefore, the scanning accuracy in the lateral direction can be enhanced.

Figure 5:
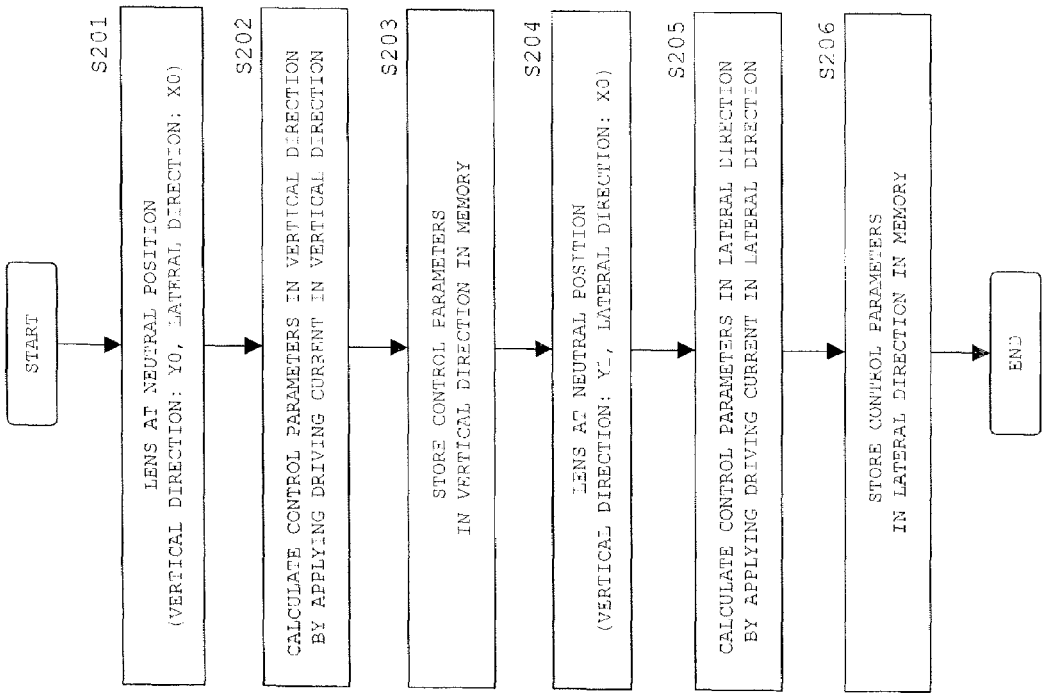
FIG. 5 is a flow chart of processing in acquiring control parameters of the embodiment.

A flow chart of this case is shown in FIG. 5.

After the acquisition processing of the control parameters is started, first, an offset signal is applied to the lens actuator 53 to position a lens at a neutral position (S201). In this time, when the control parameters Iym, Izm are acquired by the previous computation processing, values of the control parameters Iym, Izm are used straight as a offset signal in a Y direction and a Z direction, respectively. Further, when the control parameters Iym, Izm are not yet acquired, an offset value stored in the built-in memory of the DSP 10 is used.

Next, the lens is driven from the neutral position to a vertical direction (a positive direction and a negative direction of a y-axis), and the control parameters Iym and Δyd in the vertical direction are acquired (S202). Here, the processing of from S103 to S106 of FIG. 4 is performed in a positive direction and a negative direction of a Y-axis and the limit driving current values Ic and Id are acquired. Further, the computation processing of the above equations (2) and (4) is performed based on these limit driving current values to acquire the control parameters Iym and Δyd. The acquired control parameters Iym and Δyd are stored in the built-in memory of the DSP 10 (S203).

After the control parameters Iym and Δyd in the vertical direction are thus acquired, an offset signal is applied to the lens actuator 53 again to position a lens at a neutral position (S204). Here, the control parameters Iym acquired by the previous processing in the vertical direction is set as an offset signal in the vertical direction. The offset signal established by the previous processing in the vertical direction is set straight as an offset signal in the lateral direction.

Further, the lens is driven from the neutral position to a lateral direction (a positive direction and a negative direction of a Z-axis), and the control parameters Izm and Δzd in the lateral direction are acquired (S205). Here, as with the processing in the vertical direction, the processing of from S103 to S106 of FIG. 4 is performed in a positive direction and a negative direction of a Z-axis and the limit driving current values Ia and Ib are acquired. Further, the computation processing of the above equations (1) and (3) is performed based on these limit driving current values to acquire the control parameters Izm and Δzd. The acquired control parameters Izm and Δzd are stored in the built-in memory of the DSP 10 (S206).

Figure 6:
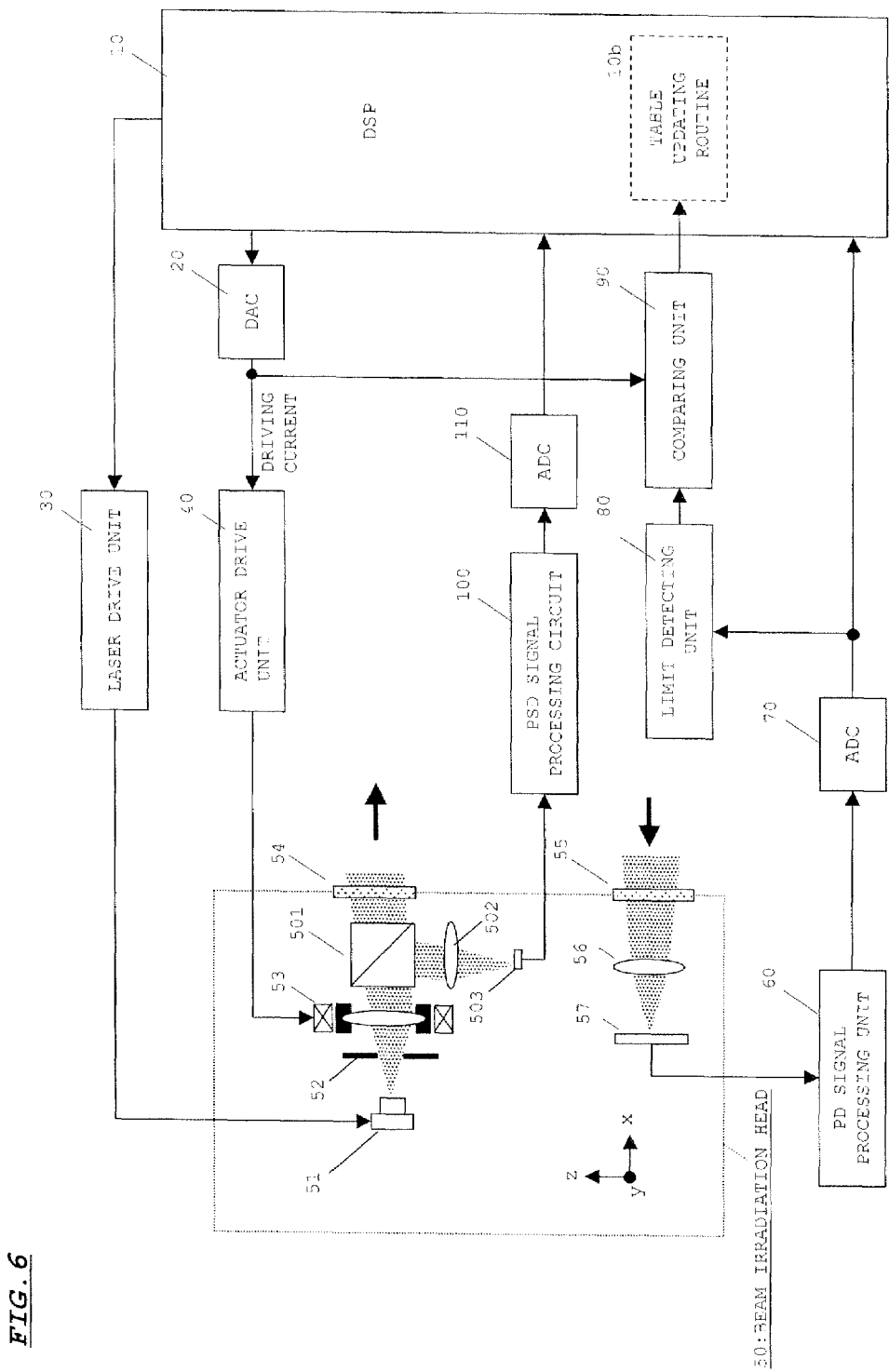
FIG. 6 shows a construction of a beam irradiation apparatus of another embodiment.

Another embodiment of the present invention is shown in FIG. 6. Incidentally, parts of the construction of FIG. 6 like the construction of FIG. 1 are denoted by like symbols and the explanations of the parts will be omitted below.

In the construction example of FIG. 6, a beam splitter 501, a condensing lens 502, and a PSD (position sensitive detector) 503 are added to the beam irradiation head 50. Further, a PSD signal processing circuit 100 and an ADC 110 are added in association with this.

A part of the laser light having passed through the lens for irradiation is reflected by the beam splitter 501 and separated from the irradiation laser light (laser light irradiated to the target region). Separated laser light (separated light) is focused on the PSD 503 through the condensing lens 502. The PSD 503 has a light receiving surface parallel with a X-Y plane in this drawing and outputs currents according to a focused position of the separated light on this light receiving surface. Here, a focused position of the separated light on the light receiving surface corresponds to an irradiation position of the above-mentioned irradiation laser light on the target region one-on-one. Therefore, a current outputted from the PSD 503 corresponds to an irradiation position of the irradiation laser light on the target region.

An output current from the PSD 503 is inputted to the PSD signal processing circuit 100. The PSD signal processing circuit 100 outputs voltage signals representing a focused position of the separated light from a current inputted to the ADC 110. The ADC 110 converts the voltage signals inputted to digital signals and outputs the digital signals to the DSP control circuit 10. The DSP control circuit 10 detects a focused position of the separated light on the light receiving surface based on the voltage signals inputted.

In addition, the DSP control circuit 10 is provided with a table (scanning table) for scanning a irradiation position of the laser light within the target region and a table (track table) representing a track of the focused position of the separated light on the light receiving surface in scanning the laser light according to this table.

A series of the driving current values applied to the lens actuator 53 are listed in the scanning table. By applying the driving current of a value listed in the scanning table to the lens actuator 53 in succession, the lens for irradiation can be positioned at positions corresponding to the respective irradiation positions established on a scanning track. Thereby, the laser light can be directed toward the respective irradiation positions established on the scanning track.

Further, when such a scanning table is used, a position of a lens driven can be set at the target position smoothly even when a relationship between the shift amount of the lens and the driving current is nonlinear.

The DSP control circuit 10 outputs the driving signals for controlling an actuator drive circuit 40 to the DAC 20 while referring to the scanning table during scanning actions of the laser light. Further, simultaneously, the DSP control circuit 10 detects a focused position of the separated light on the light receiving surface of the PSD based on the signals inputted from the ADC 110, compares the detected position with a prescribed focused position specified by the track table, and adjusts the driving currents based on the scanning table so that the detected position retract into the prescribed focused position. By such a servo mechanism, the irradiation laser light is scanned along the scanning track in the target region.

By the way, in this construction example, if secular change in the lens actuator 53 is produced, driving current values corresponding to the respective irradiation positions listed in the scanning table may be deviated from driving current values required for directing the laser light toward the respective irradiation position in actual actions. In this case, when the irradiation laser light is scanned according to the scanning table, the irradiation laser light is irradiated to a location which is out of the prescribed irradiation position. Therefore, in this case, it is necessary to appropriately update the driving current values listed in the scanning table in accordance with the above-mentioned deviations. This updating is performed by a table updating routine 10b in the DSP 10.

Figure 7:
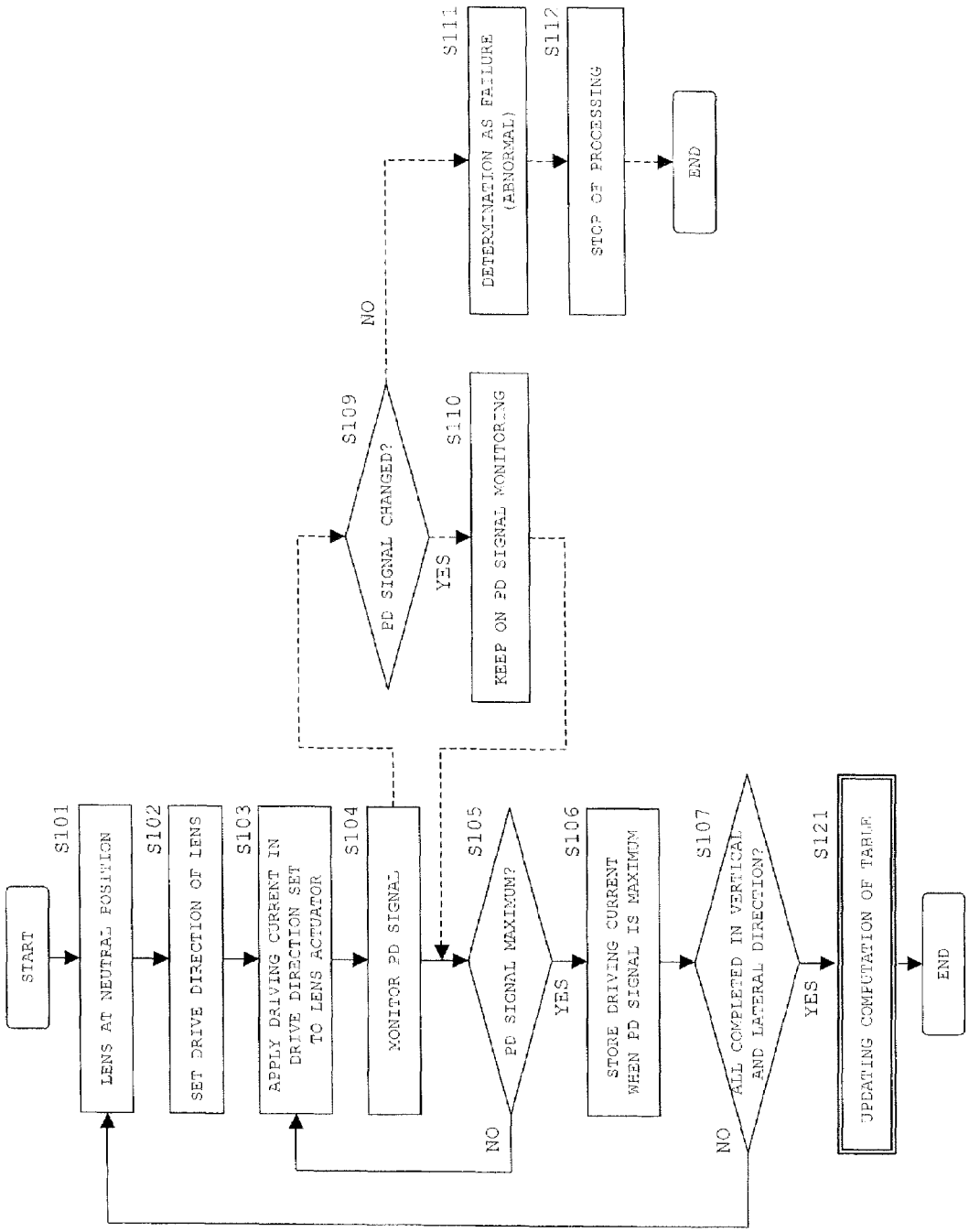
FIG. 7 is a flow chart of processing in updating a scanning table of another embodiment.

A flow chart of processing in updating a table is shown in FIG. 7. The flow chart shown in this drawing is different in a step S121 from the flow chart of FIG. 4.

Further, in this case, default values of the scanning table are stored in the DSP 10. These default values are set based on driving characteristics (nonlinear) (a reference driving characteristic in a lateral direction/a reference driving characteristic in a vertical direction), which define a relationship between the driving current and a position of a lens driven in displacing the lens for irradiation in a lateral direction and a vertical direction, respectively.

Figure 8:
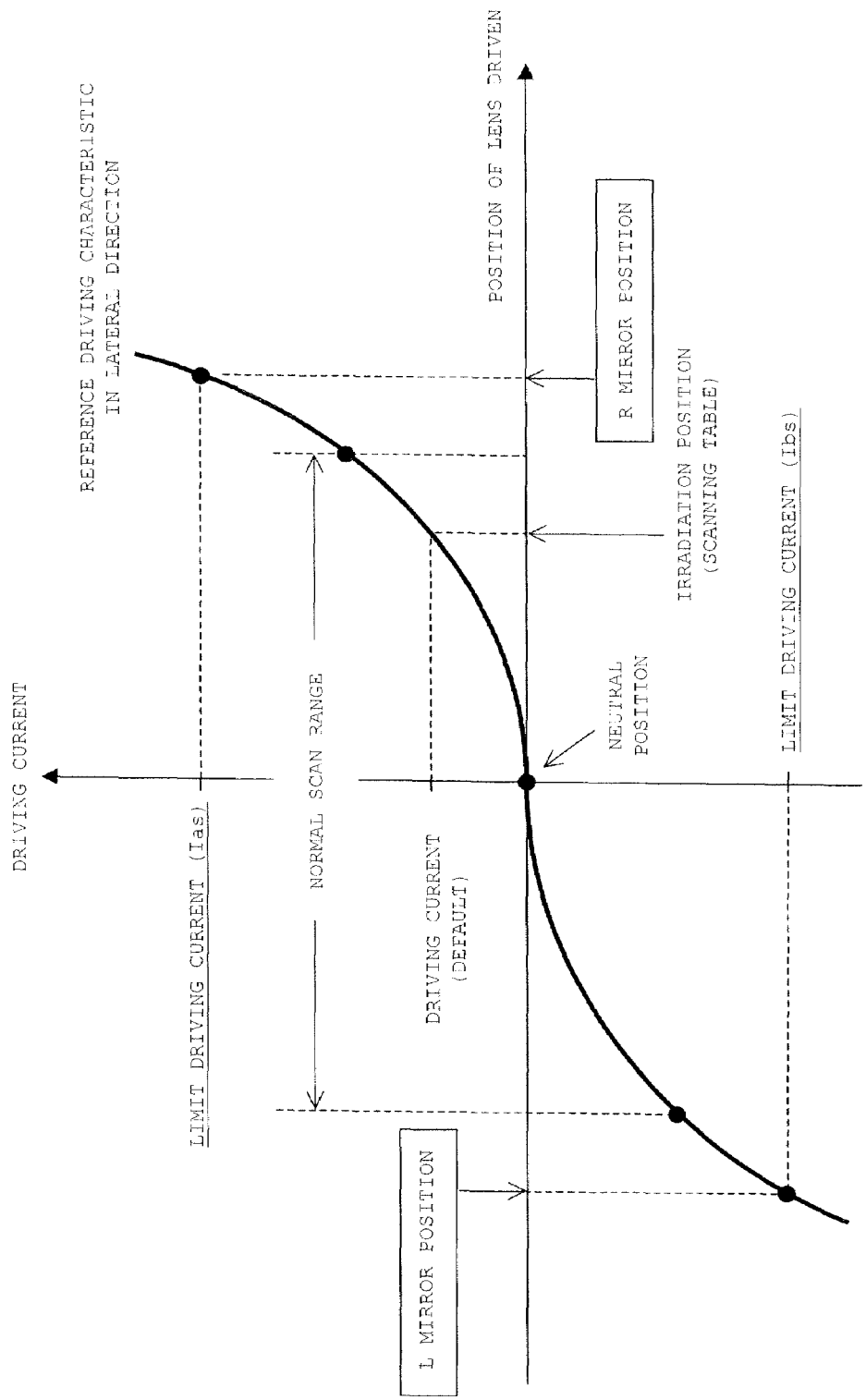
FIG. 8 is a view illustrating a reference driving characteristic in a lateral direction of another embodiment.

FIG. 8 shows a reference driving characteristic in a lateral direction.

When the default value is established, the driving current values in a lateral direction corresponding to the respective positions of a lens driven (irradiation position) on the scanning table are acquired from the reference characteristic in this drawing. Further, the acquired driving current values are stored as a default value of the driving current in a lateral direction corresponding to the respective positions of a lens driven in the DSP 10. Default values of the driving current values in a vertical direction are similarly acquired and established based on the reference driving characteristic in a vertical direction. Incidentally, limit driving currents (Ias, Ibs) are limit driving currents in scanning the laser light in a lateral direction based on this reference driving characteristic.

Referring to FIG. 7, at the step S121, first, the above-mentioned reference driving characteristic in a lateral direction and reference driving characteristic in a vertical direction are corrected based on the limit driving current values (Ia, Ib, Ic, and Id) in a vertical direction and in a lateral direction acquired actually by the processing of S101 to S107.

Figure 9:
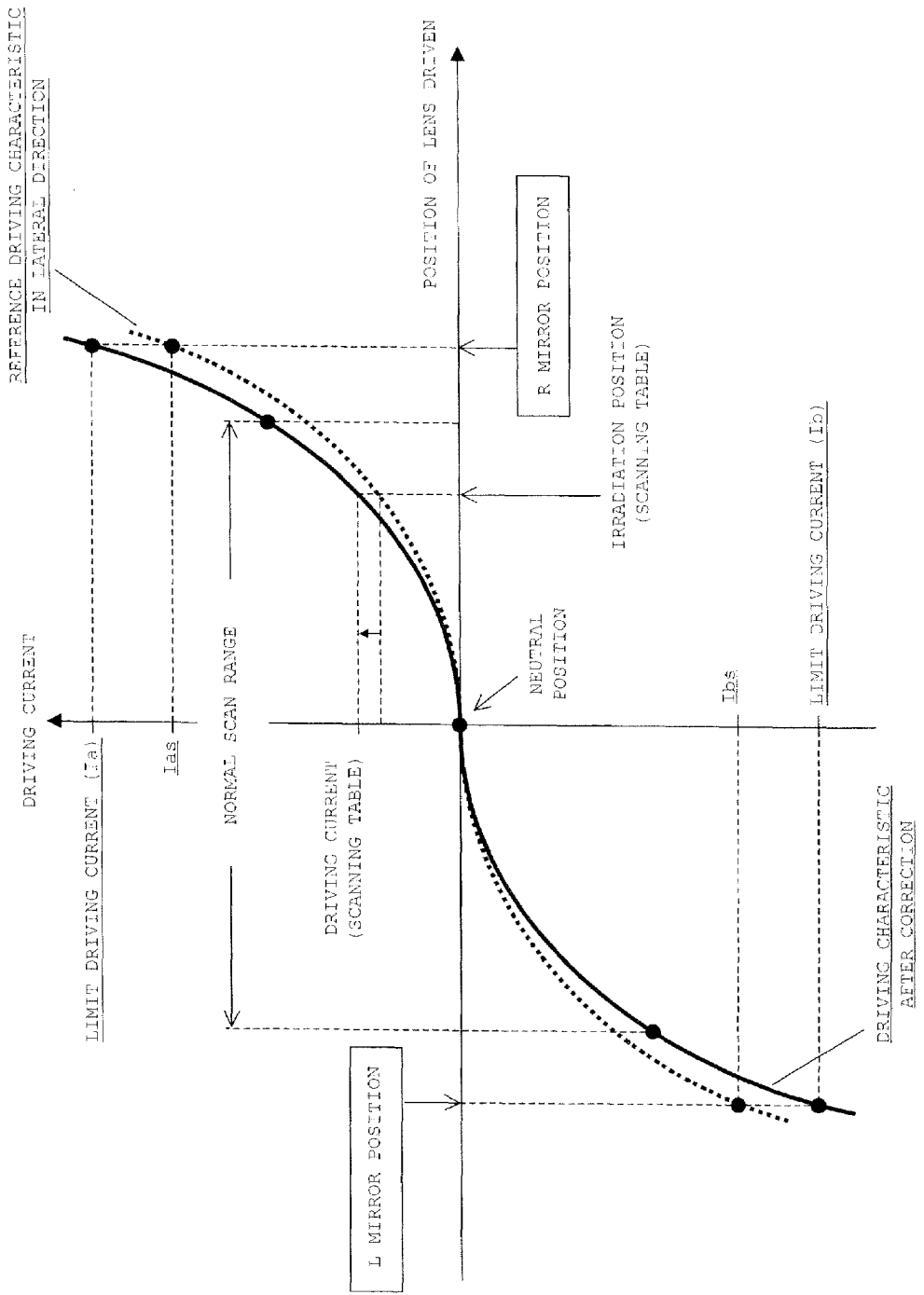
FIG. 9 is a view illustrating a method of correcting a reference driving characteristic in a lateral direction of another embodiment.

FIG. 9 is a view illustrating a method of correcting a reference driving characteristic in a lateral direction.

In this Figure, the limit driving current values (Ia and Ib) in the lateral direction acquired by the processing of S101 to S107 are deviated from Ias and Ibs on the curve of the reference driving characteristic in the lateral direction. In this case, the driving characteristics in the lateral direction are corrected from the reference driving characteristic (dotted line) to driving characteristics (solid line) passing through the point of the limit driving current values (Ia and Ib). Similarly, the driving characteristics in the vertical direction are corrected from the reference driving characteristic to driving characteristics passing through the point of the limit driving current values (Ic and Id).

After the driving characteristics are thus corrected, driving currents in a lateral direction and in a vertical direction corresponding to the respective positions of a lens driven (irradiation positions) are acquired from the corrected driving characteristics. Further, the acquired driving currents are listed in a scanning table related to the respective positions of a lens driven (irradiation positions). Thereby, updating of the scanning table at S121 is completed.

After the scanning table is thus updated, scanning Of irradiation laser light is performed based on this the scanning table until the next updating is performed. That is, the driving current of a value listed in the scanning table is applied to the lens actuator 53 in succession to shift the irradiation lens 301 to the position corresponding to the respective irradiation positions on a scanning track in succession. Further, an output level of the laser light is enhanced at each shift position and the laser light is irradiated to the target position on the scanning track.

By the way, in FIG. 9, it is assumed that when the laser light is scanned in a lateral direction, a position of the irradiation lens 301 driven (L mirror position and R mirror position) through which a signal from the PD 57 becomes the maximum is not deviated from a prescribed position. But, a secular change may cause a change in a relationship between the positions of mirrors 201, 202 and the installation positions of optical parts such as an actuator, a laser and the like. In this case, in consideration of this deviation, the reference driving characteristic in a lateral direction have to be corrected. The reference driving characteristic in a vertical direction have to be also corrected.

Figure 10:
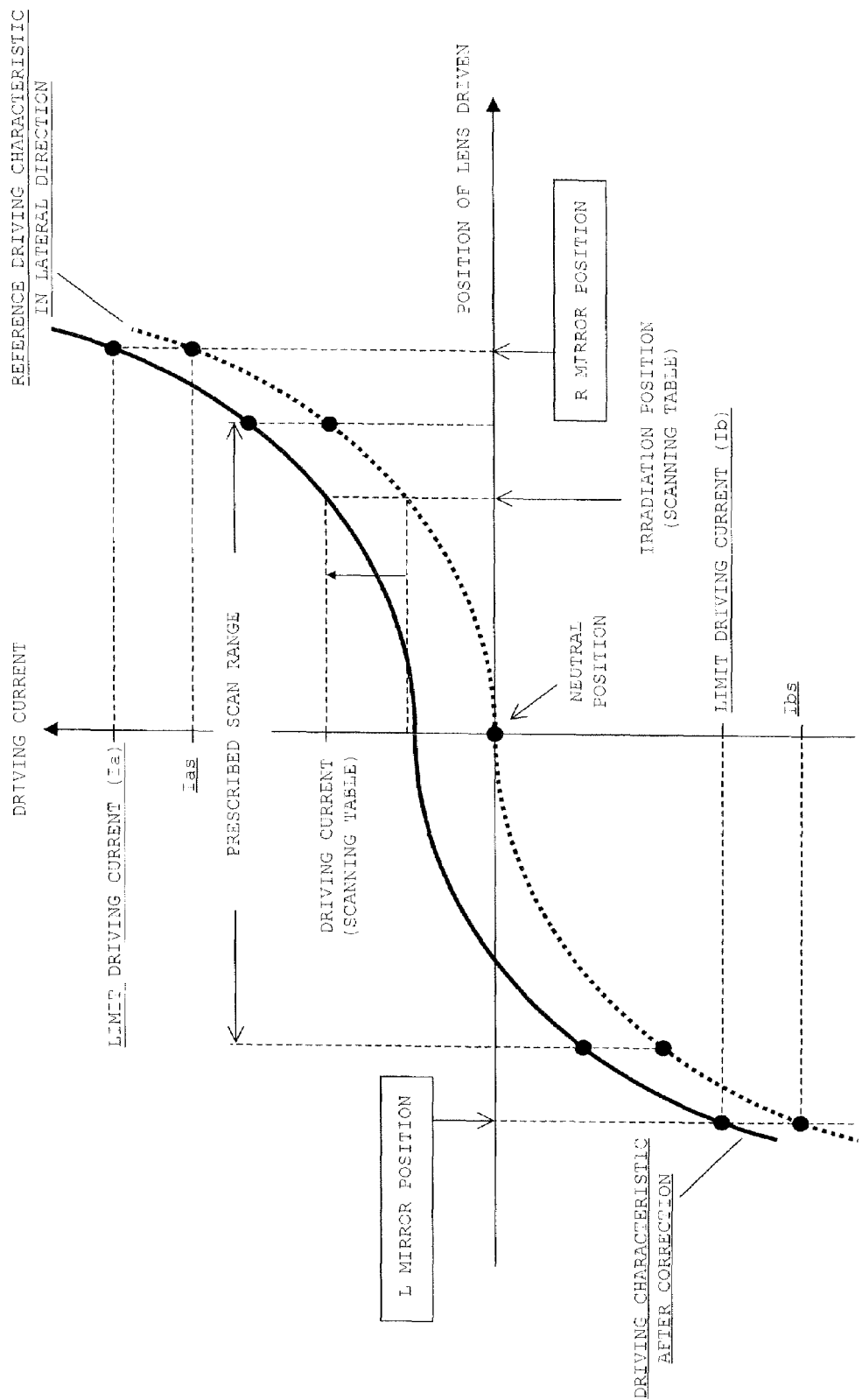
FIG. 10 is a view illustrating a method of correcting a reference driving characteristic in a lateral direction of another embodiment.

FIG. 10 is a view illustrating a method of correcting a reference driving characteristic in a lateral direction.

In this Figure, a relationship between the L mirror and R mirror positions and the installation positions of optical parts such as an actuator, a laser and the like are shifted from a prescribed position.

In this case, the driving characteristics in the lateral direction are corrected from the reference driving characteristic (dotted line) to driving characteristics (solid line) passing through the point of the limit driving current values (Ia and Ib). The driving characteristics in the vertical direction are corrected in a manner similar to this.

Further, the processing after the correction of the driving characteristics is similar to the above case. That is, the driving currents in a lateral direction and in a vertical direction corresponding to the respective positions of a lens driven (irradiation positions) are acquired from the corrected driving characteristics. Further, the acquired driving currents are listed in a scanning table related to the respective positions of a lens driven (irradiation positions). Thereby, updating of the scanning table at S121 (FIG. 7) is completed.

In addition, the L mirror position and the R mirror position are detected based on the outputs from a PSD 503 (refer to FIG. 6). That is, the DSP 10 detects positions of the irradiation lens 301 driven at the time when the maximum value of PD signals is detected at the limit detection unit 80 based on the signals (PSD signal) inputted from an ADC 110 while driving the irradiation lens 301 in a lateral direction. Further, the detected positions of the lens driven are designated as the L mirror position and the R mirror position. The positions of the irradiation lens 301 driven (U mirror position and D mirror position) through which the signal from the PD 57 becomes the maximum when the laser light is scanned in a vertical direction are also detected based on the outputs from the PSD 503.

Further, the L mirror position, the R mirror position, the U mirror position and the D mirror position are detected by using on the signals from the PSD 503 as described above, and in addition these positions can be detected by using various position detecting means such as a photocoupler and a hole element. Alternately, positions of mirrors can be detected by using a capacitance characteristic. In this case, a metal piece is placed on the side face of the irradiation lens 301 and other metal piece is secured in a manner opposed to the above metal piece in a housing of the beam irradiation head 50. The L mirror position, the R mirror position, the U mirror position and the D mirror position are detected by measuring a capacitance between both metal pieces in displacing the irradiation lens 301 in a lateral direction and a vertical direction.

Further, in this embodiment, the system is constructed so as to acquire driving currents during the scanning actions from the scanning table, but the driving currents corresponding to the respective irradiation positions (position of a lens driven) may be determined by computing directly from the corrected driving characteristics shown in FIGS. 9 and 10.

Further, in the embodiment previously described, the system is adapted to determine driving current values Imz and Imy to give a neutral position and drive amount $\Delta dz$ and $\Delta dy$ per a unit driving current from the equations (1) to (4) without detecting the L mirror position, the R mirror position, the U mirror position, and D mirror position, but the system may be adapted to determine driving current values Imz and Imy to give a neutral position and drive amount $\Delta dz$ and $\Delta dy$ per a unit driving current after detecting the L mirror position, the R mirror position, the U mirror position, and D mirror position as with this embodiment.

Figure 11:
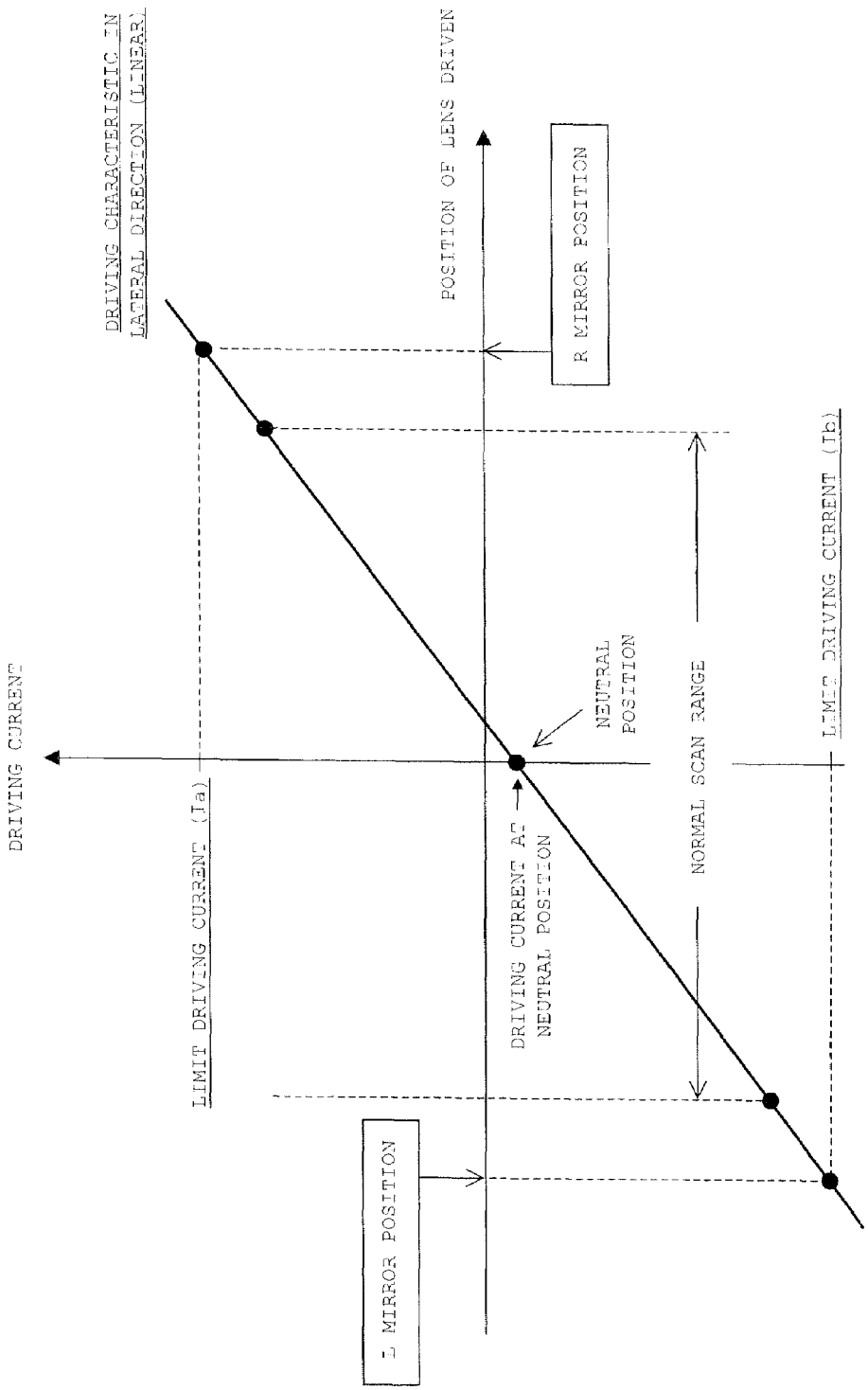
FIG. 11 is a view illustrating a method of correcting a reference driving characteristic in a lateral direction of another embodiment.

FIG. 11 is the driving characteristic in a lateral direction determined from only limit driving currents Ia and Ib without detecting the L mirror position and the R mirror position. In the embodiment previously described, by applying the equations (1) and (3) to this driving characteristic, the driving current value Imz to give a neutral position and the drive amount $\Delta dz$ per a unit driving current are calculated.

Figure 12:
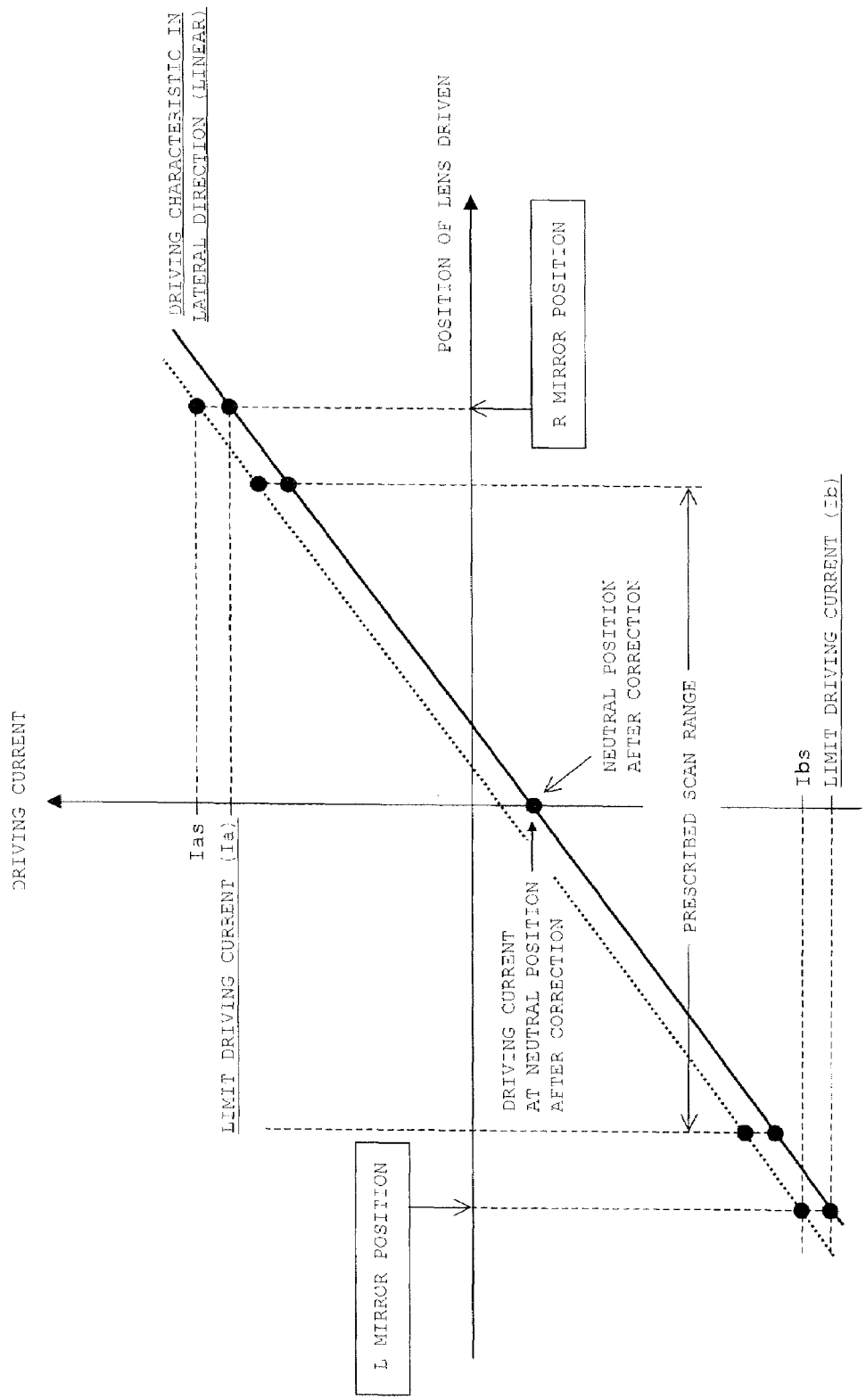
FIG. 12 is a view illustrating a method of correcting a reference driving characteristic in a lateral direction of another embodiment.

FIG. 12 is the driving current characteristic in the lateral direction determined from the L mirror position, the R mirror position, limit driving currents Ia and Ib. As shown in the drawing, in consideration of the L mirror position and the R mirror position, the driving characteristic is corrected from a curve in a dotted line to that in a solid line. Accordingly, if the equations (1) and (3) are applied to the corrected driving characteristic, the driving current value Imz to give a neutral position and the drive amount $\Delta dz$ per a unit driving current can be determined more properly. Similarly, the driving current value Imy to give a neutral position and the drive amount $\Delta dy$ per a unit driving current can be determined more properly by correcting the driving characteristics in the vertical direction in consideration of the U mirror position and the D mirror position, and applying the equations (2) and (4) to the corrected driving characteristic.

Hitherto, the embodiments of the present invention have been described, but the present invention is not limited to the above-mentioned embodiments.

For example, in the above embodiment, the mirrors are located at left, right, top and bottom positions, but the installation position of the mirrors is not limited to this position, and it may be, for example, four position of the upper right, upper left, lower right, and lower left. Further, number of mirrors may exceed four.

Further, in the above embodiment, a reflecting unit is constructed of a mirror, but not limited to this, and it may be constructed of a diffraction grating, a scattering plate, or a waveguide.

Further, in the above embodiment, the PD 57 receiving the reflected light from the target region also serves as a light receiving sensor for receiving the reflected light from the mirrors 201 to 204, but a light receiving sensor for receiving the reflected light from the mirrors 201 to 204 may be placed separately from the PD 57.

Further, in the above embodiment, an actuator of a type of scanning the laser light by driving a lens in a vertical direction and in a lateral direction relative to an optical axis has been shown, but an actuator of a type of scanning the laser light by tilting a lens relative to an optical axis may be used. Further, the present invention is applicable to the case of using an actuator by a polygon mirror.

Figures 13A, 13B:
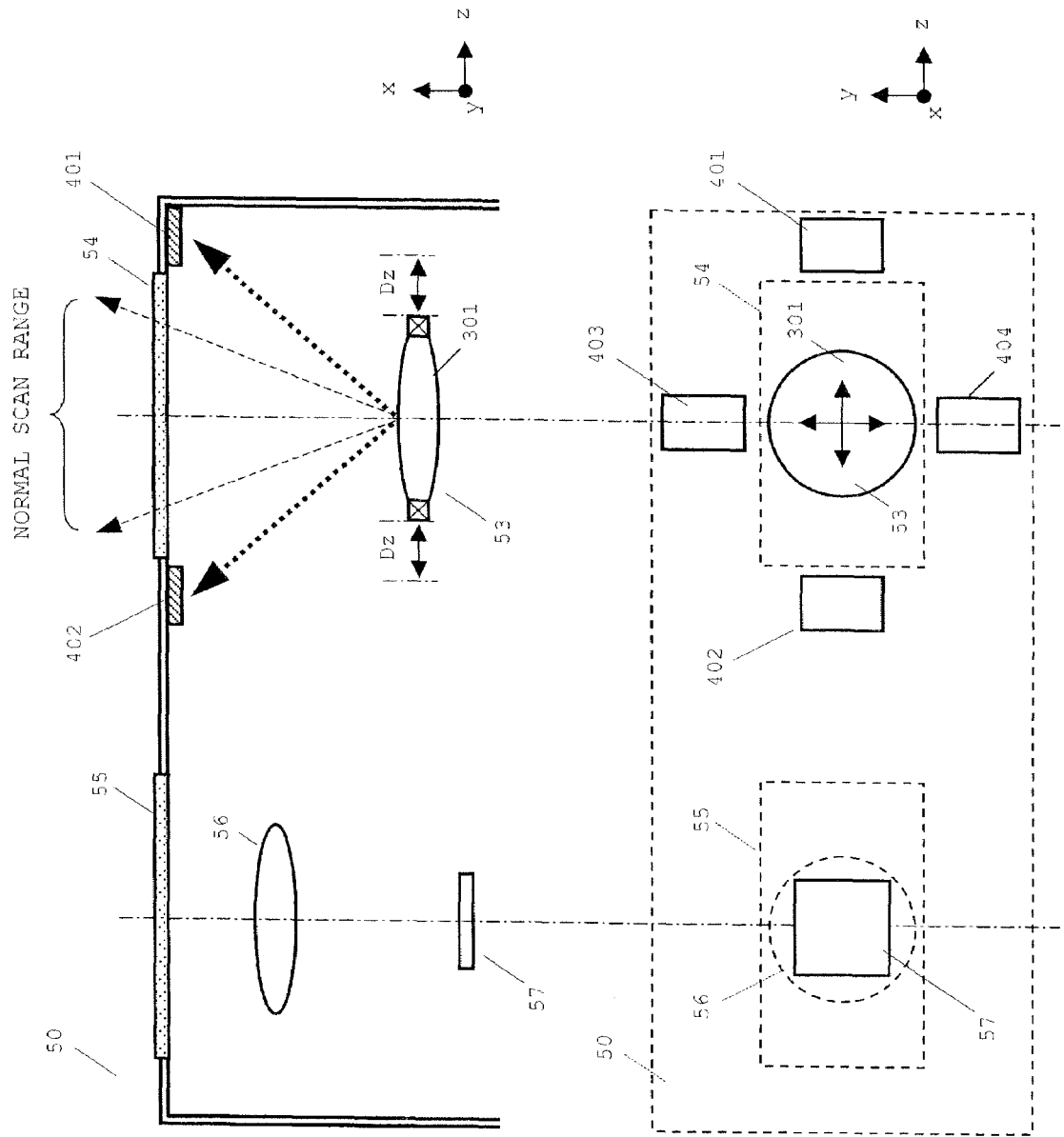
FIGS. 13A and 13B are views illustrating an arrangement of photodetectors of a further another embodiment.

Further, in the above embodiment, the system is constructed so as to receive the laser light reflected at the mirrors 201 to 204 at the PD 57, but as shown in FIG. 13A, 13B, photodetectors 401 to 404 are placed at the positions of the mirrors 201 to 204 of FIG. 3A and these photodetectors 401 to 404 may directly receive the laser light. In this case, the photodetectors 401, 402 are located at positions where the laser light enters these photodetectors 401, 402 at the maximum light quantity in the case where the irradiation lens 301 is displaced by the same distances (Dz) from a central axis of an output window 54 toward these photodetectors 401, 402 in a Z-axis direction. Further, the photodetectors 403, 404 are located at positions where the laser light enters these photodetectors 403, 404 at the maximum light quantity in the case where the irradiation lens 301 is displaced by the same distances (Dy) from a central axis of an output window 54 toward these photodetectors 403, 404 in a Y-axis direction.

In the construction examples of FIGS. 13A, 13B, outputs of the photodetectors 401 to 403 are inputted to the limit detection unit 80 in FIG. 1 or FIG. 6 through the ADC. The limit detection unit 80 monitors the quantity of received light of the photodetectors 401 to 403 based on the inputted signals and outputs the detected signal to the comparing unit 90 at the time when the quantity of received light of any one of the photodetectors 401 to 403 becomes the maximum.

The comparing unit 90 converts driving current values inputted from the DAC 20 to digital values and monitors these driving current values and the detected signals from the limit detection unit 80. Further, the comparing unit 90 detects a driving current value inputted to the actuator drive unit 40 when the detected signal is inputted from the limit detection unit 80 and outputs the detected driving current value to the DSP 10.

The DSP 10 stores the driving current value inputted in a built-in memory of the DSP 10 and executes various processing such as establishing of a neutral position, correcting of a table, described above, and the like based on this stored driving current value or based on this stored driving current value and the above-mentioned irradiation position of the irradiating laser light on the target region, which is detected in the PSD signal processing circuit 100.

In addition to this, it is to be understood that various changes and modifications may be appropriately made in the embodiment of the present invention within the scope of technical idea as set out in the appended claims.

What is claimed is:

1. A beam irradiation apparatus for irradiating a beam to a target region, comprising a light source for emitting laser light, an actuator for scanning the laser light within the target region, an actuator drive unit for applying a driving signal to the actuator, a reflecting unit located at a position beyond a normal scan range of the laser light and within a limit range of scanning by the actuator, a light receiving element for receiving the laser light reflected by the reflecting unit, a comparing unit, while monitoring a detected signal outputted from the light receiving element when scanning the laser light beyond the normal scan range, for detecting a value of the driving signal applied to the actuator at the time when the detected signal being the maximum, and a controlling unit for controlling a drive of the actuator based on the value of the driving signal detected by the comparing unit, wherein the reflecting unit is located at both positions of a first position in scanning the laser light in a first direction and a second position in scanning the laser light in a second direction opposite to the first direction.

2. The beam irradiation apparatus according to claim 1, wherein a photodetector receiving light from the target region also serves as the light receiving element.

3. The beam irradiation apparatus according to claim 1, wherein the controlling unit determines a value of the driving signal required to direct the laser light toward a neutral position in the normal scan range in the first and second directions based on the values of the driving signals detected by the comparing unit when scanning the laser light in the first direction and the second direction.

4. The beam irradiation apparatus according to claim 3, further comprising a position detecting unit for detecting a scanning position of the laser light, wherein the controlling unit determines a value of the driving signal required to direct the laser light toward a neutral position in the normal scan range in the first and second directions based on the values of the driving signals detected by the comparing unit and the scanning positions detected by the position detecting unit at the time when the values of the driving signals detected by the comparing unit.

5. The beam irradiation apparatus according to claim 1, wherein the controlling unit determines an amount of the driving signal required to displace the laser light by an unit amount of displacement in the first and second directions based on the values of the driving signals detected by the comparing unit in scanning the laser light in the first direction and the second direction.

6. The beam irradiation apparatus according to claim 5, further comprising a position detecting unit for detecting a scanning position of the laser light, wherein the controlling unit determines an amount of the driving signal required to displace the laser light by a unit amount of displacement in the first and second directions based on the values of the driving signals detected by the comparing unit and the scanning positions detected by the position detecting unit at the time when the values of the driving signals detected by the comparing unit.

7. The beam irradiation apparatus according to claim 1, wherein the controlling unit includes a table listing a value of the driving signal required to direct the laser light toward an irradiation position defined within the target region and corrects the value of the driving signal in the first and second directions listed in the table based on the values of the driving signals detected by the comparing unit in scanning the laser light in the first direction and the second direction.

8. The beam irradiation apparatus according to claim 7, further comprising a position detecting unit for detecting a scanning position of the laser light,
wherein the controlling unit corrects the value of the driving signal in the first and second directions listed in the table based on the values of the driving signals detected by the comparing unit and the scanning positions detected by the position detecting unit at the time when the values of the driving signals detected by the comparing unit.

9. The beam irradiation apparatus according to claim 1, wherein the controlling unit executes computation processing of determining a value of the driving signal required to direct the laser light toward an irradiation position defined within the target region based on drive characteristics of the actuator and corrects the drive characteristics of the actuator used in the computation processing based on the values of the driving signals detected by the comparing unit in scanning the laser light in the first direction and the second direction.

10. The beam irradiation apparatus according to claim 9, further comprising a position detecting unit for detecting a scanning position of the laser light,
wherein the controlling unit corrects the drive characteristics of the actuator based on the values of the driving signals detected by the comparing unit and the scanning positions detected by the position detecting unit at the time when the values of the driving signals detected by the comparing unit.

11. A beam irradiation apparatus for irradiating a beam to a target region, comprising
a light source for emitting laser light,
an actuator for scanning the laser light within the target region,
an actuator drive unit for applying a driving signal to the actuator,
a reflecting unit located at a position beyond a normal scan range of the laser light and within a limit range of scanning by the actuator,
a light receiving element for receiving the laser light reflected by the reflecting unit,
a comparing unit, while monitoring a detected signal outputted from the light receiving element when scanning the laser light beyond the normal scan range, for detecting a value of the driving signal applied to the actuator at the time when the detected signal being the maximum,
a position detecting unit for detecting a scanning position of the laser light, and
a controlling unit for controlling a drive of the actuator based on the value of the driving signal detected by the comparing unit and the scanning position detected by the position detecting unit at the time when the value of the driving signal detected by the comparing unit,
wherein the reflecting unit is located at both positions of a first position in scanning the laser light in a first direction and a second position in scanning the laser light in a second direction opposite to the first direction.

12. A beam irradiation apparatus for irradiating a beam to a target region, comprising
a light source for emitting laser light,
an actuator for scanning the laser light within the target region,
an actuator drive unit for applying a driving signal to the actuator,
a light receiving unit located at a position beyond a normal scan range of the laser light and within a limit range of scanning by the actuator,
a comparing unit, while monitoring a detected signal outputted from the light receiving element when scanning the laser light beyond the normal scan range, for detecting a value of the driving signal applied to the actuator at the time when the detected signal being the maximum, and
a controlling unit for controlling a drive of the actuator based on the value of the driving signal detected by the comparing unit,
wherein the light receiving unit is located at both positions of a first position in scanning the laser light in a first direction and a second position in scanning the laser light in a second direction opposite to the first direction.

13. The beam irradiation apparatus according to claim 12, further comprising a position detecting unit for detecting a scanning position of the laser light,
wherein the controlling unit controls the drive of the actuator based on the values of the driving signals detected by the comparing unit in scanning the laser light in the first direction and the second direction and the scanning positions detected by the position detecting unit at the time when the values of the driving signals detected by the comparing unit.

* * * * *